3,161,650
2-AMINO-5-ARYLOXAZOLINE PRODUCTS
George Ireland Poos, Ambler, Pa., assignor to McNeil Laboratories, Incorporated, a corporation of Pennsylvania
No Drawing. Continuation of application Ser. No. 211,841, July 23, 1962. This application Jan. 25, 1963, Ser. No. 253,983
11 Claims. (Cl. 260—307)

This is a continuation of application Serial No. 211,841, filed July 23, 1962, which in turn is a continuation-in-part of application Serial No. 824,483, filed July 2, 1959, now abandoned.

This invention relates to a new series of 2-$R_1$-4-$R_2$-5-$R_3$-oxazolines of the formula

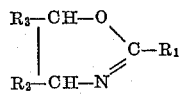

wherein $R_1$ is the primary amino group—$NH_2$; a secondary amino group, especially mono-lower alkylamino such as methylamino ethylamino, propylamino, butylamino, arylamino such as phenylamino and α-naphthylamino, $R_1$ is also a tetiary amino group such as di-lower alkylamino wherein the alkyl substitutents are those indicated above or an alkyl-arylamino group wherein the aryl substituents are phenyl or α-naphthyl. $R_2$ is hydrogen, phenyl or lower alkyl from 1 to 4 carbon atoms, forexample, methyl, ethyl, propyl, isopropyl, butyl or isobutyl. $R_3$ stands for an aromatic substituted or unsubstituted ring, more especially phenyl or substituted phenyl. The substitutents on the phenyl ring are from 1 to 5 in number and include hydroxy, lower alkoxy, e.g., methoxy, ethoxy, propoxy, butoxy, etc.; halo, especially chloro, as well as fluoro, bromo and iodo; substituted lower alkoxy such as phenylmethoxy, phenylethoxy, phenylpropoxy, etc.; substituted lower alkyl such as di-and tri-lower alkyl-alkylene, e.g., dimethylmethylene, trimethyl-methylene, etc., as well as halo-substituted alkyl including trihalo methyl, e.g., trifluoro methyl and tribromo methyl; alkylene dioxy such as methylene dioxy; and functionally converted groups such as esters; for example, methoxycarbonyl, ethoxycarbonyl, propoxycarbonyl, etc.

The invention includes methods for making the novel compounds as well as novel medicinal compositions comprising such compounds.

The available compounds possessing central nervous system stimulant activity, such as amphetamine, are subject to defects, particularly the production of side effects which limit their utility. There is therefore a demand for new and unrelated types of compounds which will exhibit such activity without possessing a chemical structure which the known compounds possess and with which their undesirable side effects appear to be connected.

It has now been found that valuable therapeutic properties, and particularly central nervous system stimulation, are possessed by all of the compounds defined by the above generic formula. Many of these compounds are new per se, as described more fully below. These, as well as the remainder of the defined class, may be used in combination with a pharmaceutical carrier, said compositions being also intended to fall within the scope of the present invention. More specifically, central nervous system stimulation may be achieved by a combination of a carrier and a 2-amino-5-aryloxazoline of the formula

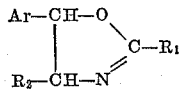

where Ar is an aromatic radical containing a phenyl-group selected from the class consisting of phenyl, methoxy-substituted phenyl including mono-, di-, and tri-methoxy phenyl; halophenyl and halomethylphenyl and $R_2$ is hydrogen and lower alkyl.

The activity of the presently provided novel compositions as central nervous system stimulants is unexpected. Closely related compounds do not have the same activity. Thus, for example, a composition comprising the known compound 2-amino-4-phenyloxazoline

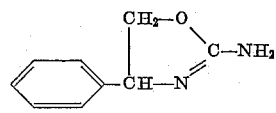

does not have the same activity as one comprising its position isomer 2-amino-5-phenyloxazoline, corresponding to the above formula. Neither does the 4-phenyl compound have the same activity as the other members of the class of 5-aryloxazolines represented by the formula shown above. Moreover, the closely related compound 2-amino-5-phenyloxazole of the formula

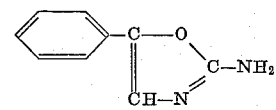

lacks the stated activity.

The compound 2-amino-5-phenyloxazoline

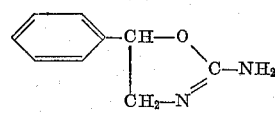

is of outstanding interest. It is a potent central nervous system stimulant and can be prepared with facility by the method of this invention from comparatively simple starting materials.

Compounds of the class 2-amino-4-alkyl-5-phenyloxazolines have been discovered, moreover, to exhibit similar activity. Illustrative of this class of compounds are, for example, 2-amino-4-methyl-5-phenyloxazoline, 2-amino-4-ethyl-5-phenyloxazoline, 2-amino-4-isopropyl-5-phenyloxazoline, 2-amino-4-isobutyl-5-phenyloxazoline, 2-amino-4-tert-butyl-5-phenyloxazoline and so forth.

A further class of compounds exhibiting the stated activity comprises 2-amino-5-aryloxazolines wherein the aryl radical is a methoxy-substituted phenyl radical. This invention provides such, and otherwise, substituted oxazolines as new compounds. In one embodiment of the invention, the compounds of this class provided hereby comprise 2-amino-5-aryloxazolines of the formula

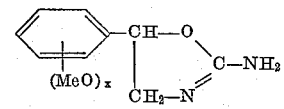

where $x$ is an integer not greater than 4.

An additional group of novel compounds provided by this invention and comprised within the scope of the general formula set forth previously comprises those containing halo-substituted phenyl radicals. Such compounds also exhibit the stated activity. This class of novel compounds comprises 2-amino-5-aryloxazolines, of the formula

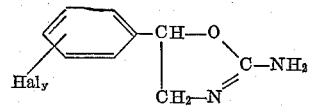

where Hal stands for iodo, fluoro, bromo or, preferably, chloro, and $y$ is an integer not greater than 5. The class of oxazolines provided by this invention which comprises chloro-substituted phenyl radicals also includes 2-amino-4-alkyl-5-aryloxazolines of the formula

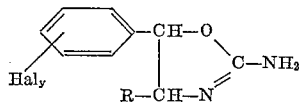

where Hal stands for iodo, bromo, fluoro, or, preferably, chloro, and y is an integer not greater than 5, and R is an alkyl radical containing from 1 to 4 carbon atoms.

Also includable as a class of compounds falling within the scope of the general formula, are the 2-alkylamino-5-aryloxazolines and the 5-trifluoromethylphenyloxazolines.

The 2-amino-5-aryloxazolines of this invention possess basic properties enabling them to form addition salts with acids and hence the compounds may be prepared and/or employed as the base or as an acid addition salt. Since the salts of these compounds are generally more water-soluble than the bases themselves, in some circumstances the salts form the more advantageous form for utilization of the compounds. If the salt is to be used in preparing a pharmaceutically useful composition to be administered to produce therapeutic effects, the salt will be one which is pharmaceuticallly acceptable. Any toxicity imparted by the salt-forming acid will therefore be taken into consideration in preparing these salts, as is customary in the art. The preferred salts are those which are not substantially more toxic than the 2-amino-5-aryloxazoline from which they are prepared and can be incorporated in either liquid or solid pharmaceutical extending media. Such salts, from which therapeutically useful compositions may be prepared, are generally referred to as pharmaceutically useful salts. Such salts will generally be the equivalents of the basic form of the 2-amino-5-aryloxazolines and are included herein and in the claims when reference is made to any of the 2-amino-5-aryloxazolines. Likewise, the compounds of the invention contain at least one asymmetric carbon atom, and can therefore exist and be isolated in various stereoisomeric forms.

According to the invention, these 2-amino-5-aryloxazolines and their salts are prepared by reacting the corresponding amino alcohol with cyanogen bromide and if desired converting the resulting base to its salt. This procedure is illustrated by the following equation:

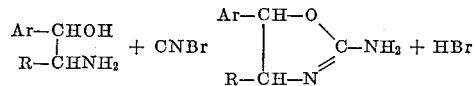

where Ar and R are as defined hereinabove. The amino alcohols used as starting materials are α-(1-aminoalkyl) benzyl alcohols or as they may otherwise be described, 2-amino-1-phenylalkanols. Illustrative of the compounds of this class which may be utilized to prepare the compounds contemplated by the invention in which R is hydrogen are, for example, α-aminomethylbenzyl alcohol, α-aminomethyl-3,4,5-trimethoxybenzyl alcohol, and α-aminomethyl-2,4-dichlorobenzyl alcohol. To obtain the products of this invention in which R is an alkyl radical, there will be used amino alcohols comprising 2-amino-1-phenyl-1-alkanols, illustrative of which are 2-amino-1-phenyl-1-propanol, 2-amino-1-(3,4,5-trimethoxyphenyl)-1-butanol, 2-amino-1-(2,4-dichlorophenyl)-1-hexanol, and so forth.

The reaction illustrated by the foregoing equation requires 1 mole of cyanogen bromide to convert 1 mole of the amino alcohol to the cyclic 2-amino-5-aryloxazoline, and generally will be conducted by reacting these reagents in approximately equimolar ratios. If desired, however, an excess of either of the stated reactants can be employed. Usually their ratio will be in the range of from about 0.9 mole of the amino alcohol per mole of cyanogen bromide to about 1.1 moles of the amino alcohol per mole of cyanogen bromide.

The reaction of these materials to effect the desired cyclization reaction will generally advantageously be conducted by contacting the stated reagents in the presence of a solvent or diluent. The solvent to be employed may be any suitable organic liquid material, such as an alcohol like methanol, ethanol or butanol; an aliphatic hydrocarbon such as pentane, hexane, or the like; an aromatic hydrocarbon such as benzene, toluene, xylene or the like; or an ether such as diethyl ether, methylethyl ether or an ether alcohol such as ethoxyethanol.

Advantageously, the cyanogen bromide will be prepared in situ in alcoholic media; for example, by adding sodium cyanide and bromine to the alcoholic solvent or diluent in which the reaction is to be carried out.

Inclusion of a base in the reaction mixture to prevent the mixture from becoming strongly acid often improves the yields obtainable. Illustrative bases are alkali and alkaline earth metal hydroxides and carbonates; tertiary amines; salts of alkali and alkaline earth metals with weak organic acids, and the like. The stated salts of weak organic acids, for example, sodium acetate, are preferred.

The reaction proceeds quite rapidly at room temperature and in general no advantage is to be gained by modifying the temperature of the reaction mixture from the ambient conditions. However, where desired, more or less elevated temperatures may be applied to modify the reaction rate. In most cases the temperature during at least the main course of the reaction will be between about 0° C. and about 40° C. The reaction will conveniently be conducted at atmospheric pressure, but may if desired be carried out at subatmospheric or at superatmospheric pressures. On completion of the reaction, the base is readily isolated by methods known to the art, for example, by solvent extraction and/or precipitation from a solvent.

The compounds of this invention may be converted to their therapeutically useful acid addition salts by reaction with an appropriate acid as, for examples, an inorganic acid such as a hydrohalic acid, i.e. hydrochloric, hydrobromic or hydriodic acid; sulfuric, nitric or thiocyanic acid; a prosphoric acid; an organic acid such as acetic, propionic, glycolic, lactic, pyruvic, oxalic, malonic, succinic, maleic, picric, fumaric, malic, tartaric, citric, benzoic, cinnamic, mandelic, methanesulfonic, ethanesulfonic, hydroxyethane-sulfonic, benzenesulfonic, p-toluenesulfonic, salicylic, p-aminosalicylic, 2-phenoxybenzoic or 2-acetoxybenzoic acid.

Depending upon the conditions employed during the course of the reaction, the novel compounds are obtained either in the form of the free bases or salts thereof. The salts are converted to the free bases in the usual manner, e.g., by reaction with alkali such as sodium or potassium hydroxide. The bases can be converted to their therapeutically useful acid addition salts by reaction with an appropriate organic or inorganic acid.

To prepare the therapeutic compositions provided by the present invention, the 2-$R_1$-4-$R_2$-5-$R_3$-oxazoline will be combined with a significant amount of a pharmaceutical carrier. The carrier may take a wide variety of forms depending on the form of preparation desired for administration. It is a significant advantage of the novel compounds provided by the present invention that they are active upon oral administration. Accordingly, the preferred compositions are adapted for oral administration, taking the form of suspensions, elixirs, capsules, or tablets, powders adapted for incorporation in liquid media, or the like. In preparing the compositions in oral dosage form, any of the usual pharmaceutical media may be employed, such as gelatin in the case of capsules; combinations of water, glycols, oils, alcohols and the like in the case of suspensions, elixirs, and solutions; starches, sugars, kaolin, salts, lubricants, binders and the like in the case of powders and tablets. Tablets represent the most advantageous oral dosage form. Alternatively, compositions comprising the stated compounds may be applied parenterally. For parenteral injection, the carrier will usually comprise sterile water, at least in large part, though other ingredients may be included. Injectable solutions may be prepared in which the carrier comprises saline solution, glucose solution or a mixture of saline and glucose solution, for example. The complete carrier, of course, will be pharmaceutically acceptable and should not impart toxicity or other undesirable side effects.

In the composition, the concentration of 2-amino-5-aryloxazoline should be at least about 0.01%, by weight, preferably at least about 0.05%. The concentration of compound may range widely above these figures, depending on the form the composition takes, and indeed, in some cases the concentration of the compound may go as high as about 50%. The amount administered may also depend on the severity of the condition being treated or on the species being treated. Generally, the compositions per dosage unit will contain at least about 0.25 mg. of the 2-$R_1$-4-$R_2$-5-$R_3$-oxazoline and in some cases the amount per dosage unit may reach as high as about 250 mg.

It is of interest to describe here, in a general way, a method which may be advantageously used for the preparation of those novel compounds in this series wherein the 2-position is occupied by a secondary or tertiary amino group and the 4- and 5-positions are occupied by any of the groups represented by the substituents $R_2$ and $R_3$ as defined above. In accordance with this process an appropriately substituted hydroxyurea such as, for example, 1,1-dimethyl-3-(1-hydroxy-1-phenyl-2-propyl)-urea undergoes a displacement reaction by treatment with a suitable reagent. The latter preferably is thionyl chloride, although other reactants susceptible to the type of reaction may also be used as, for example, hydrohalic acids such as hydrochloric acid, hydrobromic acid or hydriodic acid; p-toluenesulfonyl chloride, methanesulfonyl chloride.

The reaction is advantageously conducted in the presence of an inert organic solvent, preferably methylene chloride; or halogenated hydrocarbon such as chloroform or carbon tetrachloride; benzene or toluene.

Equimolar quantities of reactants are used, the mixture being heated at reflux conditions until the reaction is complete, i.e.: the hydroxy group has been converted to a displaceable group. The halogenated or esterified compound is concentrated, added to boiling water and heated to effect cyclization, giving the desired 2-substituted-aminooxazolines.

The present invention will be more readily understood from a consideration of the following examples which are given for purposes of illustration only and are not intended to limit the scope of the invention in any way.

EXAMPLE I

This example describes the preparation of 2-amino-5-phenyloxazoline.

A solution at room temperature is prepared by dissolving 91.2 g. (0.53 mole) of α-(aminomethyl)benzyl alcohol hydrochloride and 87 g. (1.06 moles) of sodium acetate in 1500 ml. of methyl alcohol. To this solution there is added a room temperature solution of 56 g. (0.53 mole) of cyanogen bromide in 400 ml. of methyl alcohol. The resulting reaction mixture is stirred for 30 minutes. The alcohol is then distilled off under vacuum to leave a residue which is dissolved in water, filtered, and neutralized with potassium carbonate. The resulting precipitate of crude 2-amino-5-phenyloxazoline is filtered off, and the filtrate extracted with methylene chloride. Evaporation of the methylene chloride extract yields additional crude 2-amino-5-phenyloxazoline, which is combined with the precipitated product. On recrystallization of the base from a mixture of benzene and heptane, there is obtained 62.5 g. (73% yield) of product as a crystalline material. Recrystallization of the 2-amino-5-phenyloxazoline from benzene gives glistening white crystals, M. 136–138° C. The calculated nitrogen analysis for $C_9H_{10}N_2O$ is N, 17.27%; that found is N, 17.08%. The infrared spectrum shows $\lambda_{max.}^{Nujol}$ 2.97, Shl. 3.25–3.32, 5.87, 6.16, 6.67, 7.04, 7.44$\mu$

EXAMPLE II

This example illustrates preparation of 2-amino-5-(3,4,5-trimethoxyphenyl)oxazoline and related methoxy-substituted compounds.

A solution of cyanogen bromide is prepared from 1.58 g. (0.036 mole) of sodium cyanide and 5.7 g. (0.036 mole) of bromine in methanol. To this cyanogen bromide solution (at a temperature of about 5° C.) is added a room temperature solution of 2.98 g. (0.036 mole) of sodium acetate and 7.44 g. (0.03 mole) of α-(aminomethyl)-3,4,5-trimethoxybenzyl alcohol in methyl alcohol. The resulting solution is stirred for one and a half hours at room temperature. It is then made basic by addition of ammonia and concentrated under vacuum. To the residue is added about 150 cc. of water and the mixture is made strongly basic by addition of 10% sodium hydroxide. This aqueous alkaline suspension is extracted 3 times with methylene chloride. The combined organic extracts are washed with water, dried over magnesium sulfate, filtered, and concentrated to dryness under vacuum. The residue is slurried in ether and the solid collected and dried, to give 6.04 g. of crude 2-amino-5-(3,4,5-trimethoxyphenyl)oxazoline. After three recrystallizations from acetone, the purified product melts at 181–183.5° C. and its infrared spectrum shows $\lambda_{max.}^{Nujol}$ 289, Shl. 3.03, 3.21, 5.90, 6.18, 6.26, 6.60, 6.70 7.08$\mu$.

The calculated nitrogen analysis for $C_{12}H_{16}N_2O_4$ is N, 11.11%; that found is N, 11.05%.

By using, in the above procedure, the corresponding α-(aminomethyl)-p-methoxybenzyl alcohol, α-(aminomethyl)-3,4-dimethoxybenzyl alcohol and α-(aminomethyl)-2,3,4,5-tetramethoxybenzyl alcohol, respectively, the corresponding 2-amino-5-(p-methoxyphenyl)oxazoline, 2-amino-5-(3,4-dimethoxyphenyl)oxazoline and 2-amino-5-(2,3,4,5-tetramethoxyphenyl)oxazoline, respectively, are prepared.

EXAMPLE III

This example illustrates the preparation of 2-amino-5-(2,4-dichlorophenyl)oxazoline and related chloro-substituted compounds.

A cold solution of cyanogen bromide, prepared in situ from 0.68 g. (0.014 mole) of sodium cyanide and 2.24 g. (0.014 mole) of bromine in 15 cc. of methanol, is added to a cold solution of 2.89 g. (0.013 mole) of α-aminomethyl-2,4-dichlorobenzylalcohol and 1.05 g. (0.14 mole) of sodium acetate in about 60 cc. of methanol. The solution is stirred for one-half hour at room temperature, ammonia is then added to render the solution basic and the solution is concentrated under vacuum. The residue is taken up in dilute acid and washed with methylene chloride. The methylene chloride extracts are washed once with water, dried and concentrated to dryness under vacuum. The crude crystalline materials is slurried in ether, filtered and air-dried, and a second crop of crystals is obtained from the mother liquor. The two products are combined and recrystallized from benzene to give 0.85 g. of 2-amino-5-(2,4-dichlorophenyl)oxazoline, melting at 132–134° C. The calculated analysis for $C_9H_8Cl_2N_2O$ is C, 46.78; H, 3.49; N, 12.12; that found is C, 46.90; H, 3.53; N, 12.42. The infrared spectrum shows $\lambda_{max.}^{Nujol}$ 2.93, 3.27, 5.84, 6.21, 6.27, 6.40, 7.10$\mu$ By using, in the above procedure, the corresponding α-aminomethyl-2-chlorobenzyl alcohol, α-aminomethyl-2,3,4-trichlorobenzyl alcohol, α-aminomethyl-2,3,5,6-tetrachlorobenzyl alcohol and α-aminomethylpentachlorobenzyl alcohol, respectively, the corresponding 2-amino-5-(2-chlorophenyl)oxazoline, 2-amino-5-(2,3,5-trichlorophenyl)oxazoline, 2-amino-5-(2,3,5,6-tetrachlorophenyl)

oxazoline and 2-amino-5-(2,3,4,5,6-pentachlorophenyl) oxazoline, respectively, may be prepared.

EXAMPLE IV

This example illustrates the preparation of 2-amino-4-methyl-5-phenyloxazoline and related alkyl-substituted compounds.

A mixture of 300 cc. of methanol and 50 cc. of water is used to dissolve about 35 g. (.187 mole) of 2-amino-1-phenyl-1-propanol hydrochloride and 16.9 g. (0.411 mole) of sodium acetate. To this solution there is added a solution of 21.6 g. (0.206 mole) of cyanogen bromide in 200 cc. of methanol. The mixture is stirred for one-half hour at room temperature and then concentrated under vacuum to remove the methanol. The residue is taken up in water and the resulting aqueous solution is made strongly basic with 10% sodium hydroxide and then saturated with potassium carbonate. The resulting precipitate of the crude product is filtered off, washed twice with water and dried. The yield of 2-amino-4-methyl-5-phenyloxazoline, M. 155.5–158.5° C., is 12 g. After recrystallization from benzene, the product melts at 154.5–156° C. The calculated nitrogen analysis for $C_{10}H_{12}N_2O$ is N, 15.90%; that found is N, 15.85%, 15.94%. The infrared spectrum shows $$\lambda_{max.}^{Nujol}\ 2.92,\ 3.30,\ 5.86,\ 6.20,\ 6.66,\ 7.06\mu$$

By using, in the above procedure, 2-amino-1-phenyl-1-butanol hydrochloride, 2-amino-1-phenyl-1-pentanol hydrochloride and 2-amino-1-phenyl-1-hexanol hydrochloride, respectively, the corresponding 2-amino-4-ethyl-5-phenyloxazoline, 2-amino-4-propyl-5-phenyloxazoline and 2-amino-4-butyl-5-phenyloxazoline, respectively may be prepared.

To convert the stated products of the foregoing examples to the corresponding acid salts, they may, for example, be dissolved in methanol and reacted therein with a selected organic acid such as fumaric acid. Exemplary of salts obtainable by such procedure is 2-amino-4-methyl-5-phenyloxazoline fumarate.

EXAMPLE V

This example illustrates the preparation of 2-amino-4-ethyl-5-chlorophenyloxazoline and related alkyl-substituted compounds.

A cold solution of 0.20 mole of cyanogen bromide in 200 cc. of methanol is added to a cold solution of 0.15 mole of 2-amino-1-p-chlorophenyl-1-n-butanol hydrochloride and 0.40 mole of sodium acetate in methanol. The mixture is stirred at room temperature while the reaction proceeds. Proceeding then as described in the preceding examples, the reaction mixture is treated with base to liberate the resulting oxazoline, which is then isolated. The produce is 2-amino-4-ethyl-5-(p-chlorophenyl) oxazoline.

By using 2-amino-1-(3,4-dichlorophenyl)-1-propanol, 2-amino-1-(3,4,5-trichlorophenyl)-1-butanol and 2-amino-1-(pentachlorophenyl)-1-hexanols, respectively, in the above procedure, the corresponding 2-amino-4-methyl-5-(2,4-dichlorophenyl) oxazoline, 2-amino-4-ethyl-5-(3,4,5-trichlorophenyl) oxazoline and 2-amino-4-butyl-5-(pentachlorophenyl) oxazoline, respectively, are prepared.

This example illustrates the preparation of 2-amino-4-methyl-5-(3,4,5-trimethoxyphenyl)oxazoline and related alkyl-substituted compounds.

Following substantially the procedure described in Example IV, a solution of cyanogen bromide is added to a solution of 2-amino-1-(3,4,5-trimethoxyphenyl)-1-propanol hydrochloride and sodium acetate, and the reaction mixture is stirred until reaction is complete. Alkali is added to liberate the organic base, which is isolated from the solvents employed. The product is 2-amino-4-methyl-5-(3,4,5-trimethoxyphenyl)oxazoline.

Proceeding similarly, but employing 2-amino-1-(2,4-dimethoxyphenyl)-1-propanol, 2-amino-1-(2,5-dimethoxyphenyl)-1-pentanol, and 2-amino-1-(3,4,5-trimethoxyphenyl)-3,3-dimethyl-1-butanol, respectively, there are obtained the corresponding 2-amino-4-methyl-5-(2,4-dimethoxyphenyl)oxazoline, 2-amino-4-propyl-5-(2,5-dimethoxyphenyl)oxazoline, and 2-amino-4-tert-butyl-5-(3,4,5-trimethoxyphenyl)oxazoline, respectively.

EXAMPLE VII

This example illustrates a formula for preparing 8,000 tablets each containing 5 mg. of the 2-amino-5-phenyloxazoline:

| | G. |
|---|---|
| 2-amino-5-phenyloxazoline | 40.0 |
| Milk sugar | 800.0 |
| Dibasic calcium | 1527.2 |
| Starch (filler and disintegrating agent) | 1159.3 |
| Calcium stearate | 57.7 |
| Gelatin solution (1.5 pounds per gallon) | 400.0 |

In place of the milk sugar, dibasic calcium phosphate and the portion of the starch making up the filler, there may be used sucrose, polyethylene glycol 4000, mannitol and/or calcium carbonate in various combinations and proportions. Starch paste, acacia solution, glucose solution, carboxymethylcellulose solution, shellac, or the like, may be used in place of gelatin solution as granulating agent. Calcium stearate is employed as lubricating agent and may be replaced by magnesium stearate, stearic acid, talc, or the like.

EXAMPLE VIII

The following formula may be employed for preparing a suspension containing 1 mg. of 2-amino-4-methyl-5-phenyl oxazoline per 5 cc.

| | | |
|---|---|---|
| 2-amino-4-methyl-5-phenyloxazoline | g | 0.2 |
| Propylene glycol | g | 50.0 |
| 70% sorbitol solution | g | 250.0 |
| Alcohol (7.7%) | cc | 77.0 |
| Carboxymethylcellulose (low viscosity, type 70) | g | 10.0 |
| Granulated sugar | g | 375.0 |
| Methyl ester of para-hydroxybenzoic acid | g | 1.5 |
| Propyl ester of para-hydroxybenzoic acid | g | 0.3 |
| Polyoxyethylene sorbitan monooleate | cc | 0.5 |
| Flavoring | cc | 3.0 |
| Citric acid | g | 1.5 |
| Water q.s.a.d. 1000.0 cc. | | |

In place of the propylene glycol may be used polyethylene glycol and/or glycerine. The carboxymethylcellulose may be replaced by any one of the natural gums used as suspending agents. The para-hydroxybenzoic acid esters may be replaced by any commonly used bacteriostatic agent, and other commonly used surface-active agents may be used in place of the polyoxyethylene sorbitan monooleate.

EXAMPLE IX

To a solution of 7.8 g. (0.0455 mole) of α-aminomethyl-o-methoxybenzyl alcohol and 11.2 g. (0.082 mole) of sodium acetate in 70 ml. of methanol and 5 ml. of water which is cooled in an ice bath is added over a period of 20 minutes a solution of 5.30 g. (0.505 mole) of cyanogen bromide in 50 ml. methanol. After storing the solution overnight at 0° C. the solvent is removed under reduced pressure. A solution of dilute sodium hydroxide is added and the oily layer which separates is extracted into methylene chloride. The methylene chloride extract is dried over anhydrous magnesium sulfate and concentrated to dryness. An oil is obtained which is induced to crystallize by trituration with ether. The resulting solid is collected by filtration and washed with ether; 5.6 g. (64%) melting point 92–99° C. Recrystallization from methylene chloride-methylcyclohexane affords pure 2-amino-5-(o-methoxyphenyl)-2-oxazoline, melting at 102–103° C.

EXAMPLE X

A solution of 8.00 g. (0.04 mole) of α-(aminomethyl)- anisyl alcohol and 11.8 g. (0.144 mole) of sodium acetate in 75 ml. of methanol and 5 ml. of water is cooled in an ice bath while 5.56 g. (0.0526 mole) of cyanogen bromide in 50 ml. of methanol is added in 5 minutes. The reaction mixture is stirred at room temperature for 1⅓ hours and then concentrated under vacuum to dryness. The semi-solid residue is dissolved in water and the resulting solution is made basic with 2 N sodium hydroxide; the resulting precipitate is collected on a filter washed with water and dried, giving 8.47 g. (92%) melting point 129–134° C. Purification by recrystallization from benzene gives pure 2-amino-5-(p-methoxyphenyl)-2-oxazoline, melting at 138–142° C.

EXAMPLE XI

A suspension of 12.63 g. (0.054 mole) of α-aminomethyl(m-benzyloxy)benzyl alcohol and 13.1 g. (0.16 mole) of sodium acetate in 100 ml. of methanol is treated with a solution of 5.73 g. (0.054 mole) of cyanogen bromide in 50 ml. of methanol. The solid dissolves and the resulting solution is stirred for 2 hours. The solvent is removed under reduced pressure and dilute sodium hydroxide solution is added to the residue. The resulting solid product is collected by filtration, washed with water and dried. Recrystallization from benzene affords pure crystalline 2- amino-5-(m-benzyloxyphenyl)-2-oxazoline, melting at 133–135° C.

EXAMPLE XII

A solution of 1 g. (0.0053 mole) of α-(aminomethyl)-m-hydroxybenzyl alcohol hydrochloride and 1.33 g. (0.0159 mole) of sodium bicarbonate in 40 ml. of aqueous 50% methanol is heated to 50° C. and cooled to room temperature. A solution of 0.615 g. (0.0058 mole) of cyanogen bromide in 10 ml. of methanol is added, and the reaction is stirred for 3 hours. The solvent is removed under reduced pressure and the residue is dried at 0.1 mm. for 1 hour. The residue is triturated with 2-propanol and the solid removed by filtration. The 2-propanol is evaporated under reduced pressure, and the resulting solvent is triturated with ether and collected. 2-amino-5-(m-hydroxyphenyl)-2-oxazoline weighs 0.74 g. (75% and shows a melting point of 170° C. (decomposition).

EXAMPLE XIII

To a solution of 15 g. (0.088 mole) of α-amino-methyl-p-chlorobenzyl alcohol and 21.6 g. (0.264 mole of sodium acetate in 200 ml. of aqueous methanol is added dropwise with ice bath cooling a solution of 9.3 g. (0.088 mole) of cyanogen bromide in methanol. The resulting pink solution is stirred for 10 minutes at 0° C. and 1½ hours at room temperature. The methanol is evaporated under vacuum and water is added to the residue. The resulting oily mixture is made basic with aqueous sodium hydroxide solution. The solid product which separates is collected by filtration, washed thoroughly with water and air-dried; affording 9.8 g. (57%) melting point 92–102° C. Purification by recrystallization from benzene gives pure 2-amino-5-(p-chlorophenyl)-2-oxazoline with a melting point of 118–119° C.

EXAMPLE XIV

A solution of 8.0 g. (0.0406 mole) of α-aminomethyl-o-chlorobenzyl alcohol and 6.8 g. (0.08 mole) of sodium acetate in 50 ml. of methanol is treated with a solution of 4.3 g. (0.0406 mole) of cyanogen bromide in 20 ml. of methanol. The reaction mixture is stirred for 1 hour at ° C. The solvent is evaporated under reduced pressure and the oily residue is dissolved in the minimum quantity of water. The resulting solution is made basic with concentrated potassium carbonate solution and the white solid which precipitates is extracted into methylene chloride. The methylene chloride solution is washed with brine, dried over anhydrous potassium carbonate, and evaporated to dryness. There is obtained 6.4 g. (80%) of solid product. Purification by recrystallization from benzene-hexane gives pure 2-amino-5-(o-chlorophenyl)-2-oxazoline, melting at 128–130° C.

EXAMPLE XV

To an ice-cold solution of 2.3 g. (0.0112 mole) of α-aminomethyl-p-trifluoromethylbenzyl alcohol in 15 ml. of methanol and 2.76 g. (0.0336 mole) of sodium acetate in 10 ml. of water is added dropwise a solution of 1.3 g. (0.0123 mole) of cyanogen bromide in 25 ml. of methanol. The solution is stirred for ½ hour at 0° C. and for 1½ hours at room temperature and then is concentrated under vacuum to remove the methanol. The resulting oily residue is dissolved in water and the solution is made basic with concentrated sodium hydroxide solution. The solid product which separates is collected by filtration, washed with water and air-dried giving 2.44 g. (93%), melting point 85–90° C. Pure 2-amino-5-[p-(α,α,α-trifluorotoyl)]-2-oxazoline is obtained by recrystallization from benzene-petroleum ether and shows a melting point 97–100° C.

EXAMPLE XVI

A solution of 3.30 g. (0.028 mole) of cyanogen bromide in 30 ml. of methanol is added dropwise to a stirred solution of 5 g. (0.0279 mole) of α-aminomethyl-p-isopropylbenzyl alcohol and 6.9 g. (0.084 mole) of sodium acetate in 50 ml. of methanol. The reaction is allowed to continue for 1 hour at room tempearture. The solvent is then removed under reduced pressure and dilute sodium hydroxide solution is added to the residue. The resulting fine white crystalline precipitate is collected by filtration, washed with water and dried under vacuum giving 4.8 g. (85%), melting point 150–154° C. Recrystallization from benzene-ether gives pure 2-amino-5-(p-isopropylphenyl)-2-oxazoline, melting at 158–160° C.

EXAMPLE XVII

To a solution of 24 g. (0.12 mole) of α-aminomethyl)-veratryl alcohol and 26.03 g. (0.32 mole) of sodium acetate in 250 ml. of aqueous methanol is added a solution of 12.5 g. (0.12 mole) of cyanogen bromide in 250 ml. of methanol. The solution is cooled in an ice bath during the addition and then is allowed to warm to room temperature over a period of 2½ hours. The solution is concentrated under vacuum to remove the methanol and water is added to the residue. The resulting oily mixture is made basic with concentrated aqueous sodium hydroxide solution and this aqueous mixture is extracted three times with methylene chloride. The combined extracts are washed with water, dried over anhydrous magnesium sulfate, filtered and concentrated to dryness under vacuum. The resulting solid residue is slurried in ether, filtered, washed with ether and air-dried, affording 17.7 g. (66.5), melting point 95–111° C. Pure 2-amino-5-(3,4-dimethoxyphenyl)-oxazoline is obtained by recrystallization from ethyl acetate and melted at 119–121° C.

EXAMPLE XVIII

To a solution of 25.8 g. (0.142 mole) of α-aminomethylpiperonyl alcohol and 35 g. (0.426 mole) of sodium acetate in 250 ml. of aqueous methanol is added rapidly dropwise a solution of 17.5 g. (0.165 mole) of cyanogen bromide in 200 ml. of methanol. The solution is cooled in an ice bath during the addition and then is allowed to warm to room temperature over a 1½ hours period. The methanol solvent is evaporated under vacuum, water is added to the residue and the resulting solution is made basic with concentrated sodium hydroxide solution. The crystalline solid which precipitates is collected by filtration, washed with water, dried, washed two times with ether and dried under vacuum over calcium chloride to give 24 g. (82%), melting point 173–179° C. Pure 2-amino-5-(3,4-methylenedioxyphenyl)-2-oxazoline is obtained by recrystallization from 2-propanol and melts at 178.5–180.5° C.

EXAMPLE XIX

A solution of 10.5 g. (0.050 mole) of 1-methyl-3-(1-hydroxy-1-phenyl-2-propyl)urea in 100 ml. of methylene chloride is cooled to 0° C. and a solution of 3.9 ml. (0.050 mole) of thionyl chloride in 20 ml. of methylene chloride is added. The mixture is heated under reflux for 30 minutes. The solvent is evaporated under vacuum and the residue is dissolved in boiling water. The resulting solution is cooled, filtered from a small amount of insoluble material and made basic by the addition of potassium carbonate solution. An oil separates which is extracted into methylene chloride. The methylene chloride solution is dried over anhydrous sodium sulfate and this solution is evaporated to dryness under vacuum to give 7.9 g. (86%) of crystalline product, melting point 122–126° C. Two recrystallizations from benzene-hexane give pure 2-methylamino-4-methyl-5-phenyl-2-oxazoline, melting at 129–131° C.

EXAMPLE XX

A solution of 10.0 g. (0.045 mole) of 1-(1-hydroxy-1-phenyl-2-propyl)-3-ethylurea in 100 ml. of methylene chloride is treated with 3.2 ml. (0.045 mole) of thionyl chloride. The mixture is heated under reflux for 1 hour, the solvent is evaporated and the residual oil is added to boiling water. This mixture is boiled for 30 minutes and then cooled, filtered from a small amount of insoluble material and made basic by the addition of potassium carbonate solution. An oily product separates which is extracted with benzene. The benzene extract is dried over anhydrous magnesium sulfate and then concentrated to dryness to yield the product at 6.0 g. of yellow oil. This oil is dissolved in 10 ml. of 2-propanol and 3.4 g. of fumaric acid dissolved in the minimum quantity of 2-propanol is added. The white crystal salt which precipitates amounts to 8.5 g. (60%), melting point 141–142° C. Purification by recrystallization from 2-propanol gives pure 2-ethylamino-4-methyl-5-phenyl-2-oxazoline fumarate, melting point 146–147° C.

EXAMPLE XXI

A solution of 1.45 ml. (0.02 mole) of thionyl chloride in 10 ml. of methylene chloride is added to a solution of 5.4 g. (0.02 mole) of 1-(1-hydroxy-1-phenyl-2-propyl)-3-phenylurea in 50 ml. of methylene chloride. The mixture is heated under reflux for 1 hour and the solvent is removed under vacuum, leaving an amber oil. This oil is added to boiling water and the mixture is heated for 30 minutes. The aqueous solution is decanted from residual oil and made basic with dilute sodium hydroxide solution. The white gum which separates is collected by centrifugation. This gum is crystallized by trituration with 2-propanol. Pure 2-anilino-4-methyl-5-phenyl-2-oxazoline is obtained by a recrystallization from 2-propanol and shows a melting point of 130–131° C.

EXAMPLE XXII

A suspension of 5.0 g. (0.017 mole) of 1-(2-hydroxy-2-p-chlorophenyl-1-ethyl)-3-phenylurea in 200 ml. of methylene chloride is treated with 1.9 g. (0.017 mole) of thionyl chloride. After heating under reflux for 1 hour, the solvent is removed under vacuum and the residual oil is boiled with water for 30 minutes. In this instance, a water-insoluble solid residue remains which is collected by filtration, washed with water and dried. In this manner, there is recovered 3.6 g. (72%) of unchanged starting material, melting point 205–207° C. The solution from the boiling water treatment is made basic with potassium carbonate solution which precipitates the crystalline product, 2-anilino-5-p-chlorophenyl-2-oxazoline. Purification by recrystallization from 2-propanol leads to 1.3 g. (99% yield, 28% conversion), melting point 148–150° C.

EXAMPLE XXIII

A solution of 1.42 ml. (0.02 mole) of thionyl chloride in 10 ml. of methylene chloride is added to a solution of 6.4 g. (0.02 mole) of 1-(1-hydroxy-1-phenyl-2-propyl)-3-α-naphthylurea in 100 ml. of methylene chloride. The mixture is heated under reflux for 1 hour, the solvent is evaporated under vacuum and the residual oil is added to boiling water. This mixture is heated for 30 minutes and then cooled, centrifuged, and the small amount of insoluble solid is discarded. When the aqueous solution is made basic with potassium carbonate solution, the white solid product precipitates. It is collected by filtration, washed with water in ether, and dried. There is obtained 2.9 g. (48%), melting point 181–182° C. 2-(α-naphthylamino)-4-methyl-5-phenyl-2-oxazoline is pure in that recrystallization from 2-propanol does not change the melting point.

EXAMPLE XXIV

A solution of 4.31 g. (0.0194 mole) of 1,1-dimethyl-3-(1-hydroxy-1-phenyl)-2-propylurea in 30 ml. of methylene chloride is treated with 1.37 ml. (0.0194 mole) of thionyl chloride in 10 ml. of methylene chloride. The reaction mixture is heated under reflux for 1 hour and then concentrated to dryness under vacuum. The residual oil is heated in boiling water for 30 minutes and the resulting solution, after cooling, is filtered from a small amount of insoluble material. The resulting aqueous solution is made basic with potassium carbonate solution and the oily product which separates is extracted with methylene chloride. The methylene chloride extract is dried over anhydrous sodium sulfate and then concentrated to dryness under vacuum providing 3.7 g. of the product as an oil. This oily product is purified by distillation through a short column, giving 1.85 g. of 2-dimethylamino-4-methyl-5-phenyl-2-oxazoline as a clear oil, boiling point 108–110° C. at 0.75 mm.

EXAMPLE XXV

A solution of 8.0 g. (0.033 mole) of 1,1-dimethyl-3-(2-hydroxy-2-p-chlorophenylethyl)urea in 50 ml. of methylene chloride is treated with 2.4 ml. (0.033 mole) of thionyl chloride and the resulting solution is heated under reflux for 1 hour. The methylene chloride solvent is evaporated under vacuum and the residual oil is boiled with water for 30 minutes, cooled, and separated from a small amount of insoluble material. The resulting aqueous solution is made basic with poatassium carbonate solution and the oily product which separates is extracted with methylene chloride. The methylene chloride extract is dried, concentrated to dryness and the residual oily product is distilled to give 4.25 g. (55% yield) of pure 2 - dimethylamino - 5 - (p - chlorophenyl) - 2 - oxazoline as a clear, colorless oil, boiling point 145° C. at 0.5 mm.

EXAMPLE XXVI

To a cold, stirred suspension of 9.2 g. (0.043 mole) of 1,2-diphenyl-2-aminoethanol in 250 ml. of methanol containing 10.7 g. (0.13 mole) of sodium acetate and 30 ml. of water is added dropwise 5.05 g. (0.048 mole) of cyanogen bromide in 100 ml. of methanol. After stirring ½ hour at room temperature, the mixture becomes homogenous and is allowed to stand at room temperature overnight. The methanol is removed by vacuum distillation and the residue is dissolved in water and made basic with cold, 20% sodium hydroxide solution. The white solid product precipitates and is collected by filtration, washed with water and dried. Pure cis-2-amino-4,5-diphenyloxazoline is obtained by recrystallization from methanol and melts at 216–217° C.

EXAMPLE XXVII

A solution of 4.2 g. (0.0204 mole) of α-aminomethyl-p-carbomethoxybenzyl alcohol and 5:25 g. (0.0612 mole) of sodium acetate in 100 ml. of methanol is treated with a solution of 2.16 g. (0.0204 mole) of cyanogen bromide in 10 ml. of methanol. The mixture is stirred at room temperature for 1 hour and then concentrated under vacuum to remove the methanol. The residue is dissolved in water and the resulting solution is made basic with concentrated potassium carbonate solution. The precipitated white solid product is collected by filtration and washed with water. The filtrate is extracted with methylene chloride and the solid product is dissolved in methylene chloride. The combined methylene chloride solution is washed with brine, dried over anhydrous sodium sulfate and evaporated to dryness affording 4.0 g. (86% yield) of white solid product. Purification by recrystallization from methylene chloride-ether gives pure 2-amino-5-(p-carbomethoxyphenyl)-2-oxazoline melting at 158–159° C.

EXAMPLE XXVIII

A solution of 5.6 g. (0.0258 mole) of α-aminomethyl-p-bromobenzyl alcohol and 6.35 g. (0.0775 mole) of sodium acetate in 100 ml. methanol is treated with a solution of 2.84 g. (0.0258 mole) of cyanogen bromide in 10 ml. of methanol. The mixture is stirred at room temperature for 1 hour and then concentrated under vacuum to remove the methanol. The residue is dissolved in water and the resulting solution is made basic with concentrated potassium carbonate solution. The precipitated white solid product is collected by filtration and washed with water. The filtrate is extracted with methylene chloride and the solid product is dissolved in methylene chloride. The combined methylene chloride solution is washed with brine, dried over anhydrous sodium sulfate and evaporated to dryness affording white solid 2-amino-5-(p-bromophenyl)-2-oxazoline which is purified by recrystallization from benzene.

EXAMPLE XXIX

A solution of 8.9 g. (0.0575 mole) α-aminomethyl-p-fluorobenzyl alcohol and 14.1 g. (0.172 mole) of sodium acetate in 150 ml. methanol is treated with a solution of 6.09 g. (0.0575 mole) of cyanogen bromide in 10 ml. of methanol. The mixture is stirred at room temperature for 1 hour and then concentrated under vacuum to remove the methanol. The residue is dissolved in water and the resulting solution is made basic with concentrated potassium carbonate solution. The precipitated white solid product is collected by filtration and washed with water. The filtrate is extracted with methylene chloride and the solid product is dissolved in methylene chloride. The combined methylene chloride solution is washed with brine, dried over anhydrous sodium sulfate and evaporated to dryness affording white solid 2-amino-5-(p-fluorophenyl)-2-oxazoline which is purified by recrystallization from methylene chloride-ether.

The central nervous system stimulant action of the presently provided compositions can be demonstrated on both anesthetized and unanesthetized test species. Thus, a composition comprising 2-amino-5-phenyloxazoline and adapted for intravenous administration applied to an anesthetized test species intravenously at a dose rate of 1 mg. per kilogram stimulates the central nervous system as evidenced by increased motor activity. In the unanesthetized test species, central effects manifested by restlessness, running, circling, and apprehension have been observed after the intravenous administration of 2.5 milligrams per kilogram. The activity of the presently provided novel compositions has also been demonstrated by oral administration of solid compositions containing the therapeutic compositions of the invention.

What is claimed is:
1. A compound of the formula

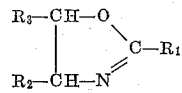

where $R_1$ is a member of the group consisting of amino, phenylamino, α-naphthylamino, mono-lower alkylamino, and di-lower alkylamino, $R_2$ is a member of the group consisting of hydrogen and lower alkyl and $R_3$ is a member of the group consisting of halophenyl, hydroxyphenyl, phenyl-lower alkoxyphenyl, lower alkyl-alkylene-phenyl, di-lower alkyl-alkylene-phenyl, halo-methyl-phenyl, alkylene-dioxy-phenyl, and lower alkoxy-carbonyl-phenyl.

2. A compound of the formula

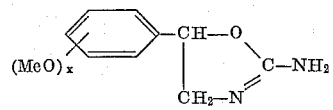

wherein $x$ is an integer not greater than 4.

3. A compound of the formula

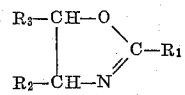

where $R_1$ is a member of the group consisting of mono-lower alkylamino, di-lower alkylamino, phenylamino and α-naphthylamino, $R_2$ is a member of the group consisting of hydrogen and lower alkyl, and $R_3$ is phenyl.

4. 2-amino-5-halophenyloxazoline.
5. 2-amino-4-lower alkyl-5-halophenyloxazoline.
6. 2-amino-5-(3,4-dimethoxyphenyl)oxazoline.
7. 2-amino-5-(3,4,5-trimethoxyphenyl)oxazoline.
8. 2-amino-5-(2,4-dichlorophenyl)oxazoline.
9. 2-amino-5-(p-trifluoromethylphenyl)oxazoline.
10. 2-dimethylamino-4-methyl-5-phenyloxazoline.
11. 2-amino-5-(p-chlorophenyl)oxazoline.

References Cited in the file of this patent
UNITED STATES PATENTS 2,576,106    Cusic    Nov. 27, 1951
2,951,078    Biel    Aug. 30, 1960
3,007,938    Kirchner    Nov. 7, 1961

OTHER REFERENCES

Wiley et al.: Chem. Reviews, vol. 44, pages 464–9 (1949).

UNITED STATES PATENT OFFICE
CERTIFICATE OF CORRECTION

Patent No. 3,161,650                              December 15, 1964

George Ireland Poos

It is hereby certified that error appears in the above numbered patent requiring correction and that the said Letters Patent should read as corrected below.

Column 4, line 37, for "examples" read -- example --; column 6, line 30, for "289" read -- 2.89 --; column 7, line 54, for "produce" read -- product --; column 9, line 42, for "(75%" read -- (75%) --; line 46, for "(0.264 mole" read -- (0.264 mole) --; same column 9, line 68, for "° C." read -- 0° C. --; column 10, line 39, for "α-aminomethyl)-" read -- α-(aminomethyl)- --; column 12, line 71, for "5:25 g." read -- 5.25 g. --.

Signed and sealed this 2nd day of November 1965.

(SEAL)
Attest:

ERNEST W. SWIDER                            EDWARD J. BRENNER
Attesting Officer                                 Commissioner of Patents